United States Patent [19]

Delaney

[11] Patent Number: 5,677,910

[45] Date of Patent: Oct. 14, 1997

[54] HIGH PERFORMANCE TWO-PORT TRANSPORT LAN BRIDGE

[75] Inventor: David M. Delaney, Ottawa, Canada

[73] Assignee: Plaintree Systems Inc., Ontario, Canada

[21] Appl. No.: 354,250

[22] Filed: Dec. 12, 1994

Related U.S. Application Data

[63] Continuation of Ser. No. 925,655, Aug. 7, 1992, abandoned.

[51] Int. Cl.$^6$ ................................................. H04L 12/46
[52] U.S. Cl. ......................................................... 370/402
[58] Field of Search .............................. 370/85.1, 85.13, 370/85.14, 85.15, 94.1, 94.2, 60, 60.1, 400, 401, 402, 403, 404, 405, 293, 389, 410; 340/825.5; 395/200.02

[56] References Cited

U.S. PATENT DOCUMENTS

| | | | |
|---|---|---|---|
| 4,627,052 | 12/1986 | Hoare et al. | 370/85.13 |
| 4,737,953 | 4/1988 | Koch et al. | 370/94.1 |
| 4,922,503 | 5/1990 | Leone | 370/85.13 |
| 4,972,409 | 11/1990 | Backes | 370/94.1 |
| 5,027,350 | 6/1991 | Marshall | 370/85.13 |
| 5,060,228 | 10/1991 | Tsutsui et al. | 370/85.13 |
| 5,130,981 | 7/1992 | Murphy | 370/85.13 |
| 5,151,897 | 9/1992 | Suzuki | 370/85.13 |

Primary Examiner—Benedict V. Safourek
Assistant Examiner—Chau T. Nguyen
Attorney, Agent, or Firm—Antonelli, Terry, Stout & Kraus, LLP.

[57] ABSTRACT

A transparent bridge between a pair of local area networks is comprised of a database for storing destination addresses for frames of data, a pair of frame transfer agents each connected to the database for transferring frames of data in respectively opposite directions from one LAN to the other depending on whether addresses stored in the database correspond to destination addresses of the frames of data.

4 Claims, 4 Drawing Sheets

HIGH PERFORMANCE TWO-PORT TRANSPORT LAN BRIDGE

This application is a continuation application of Ser. No. 07/925,655, filed Aug. 7, 1992, now abandoned.

FIELD OF THE INVENTION

This invention relates to data transmission and particularly to a data bridge between two local area networks (LANs).

BACKGROUND TO THE INVENTION

Transparent bridging between two local area networks (LANs) is defined by "IEEE Standard 802.1d-1990 Media Access Control (MAC) Bridges", Mar. 8, 1991. This disclosure uses the terminology of the IEEE 802.1d document.

A transparent bridge transmits and receives frames of data. The purpose of the bridge is to transfer payload frames (traffic) between local area networks (LANs) connected to the bridge. A frame is said to be forwarded from one LAN to another. The bridge also receives and transmits messages—frames destined to, or originated by, management entities internal to the bridge.

A bridge must discriminate between received frames destined for a management entity within the bridge, and received frames which are to be forwarded or discarded. Management entities in the bridge also originate frames to be transmitted on one or more of the LAN media. The distributed spanning tree calculation procedure specified by IEEE 802.1d is one such management entity. The local agent of an external management system is another such management entity. Frames received and sent by the management entities of the bridge are called messages in this disclosure.

Prior art transparent two-port bridges contain a microprocessor which performs frame transfer and message discrimination for both directions of frame transfer; sometimes this single microprocessor also performs message processing and other management activities; sometimes a second microprocessor is provided to perform message processing and management activities.

The LANs are connected to a bus with the microprocessor and a CAM, the bus carrying two-way traffic between the LANs. This limits the data transfer capacity of the bridge.

The microprocessor must not only discriminate messages and control frame transfer between both of the LANs, it must also react to the messages received from either of the two LANs and destined for itself. Consequently the microprocessor must time share between various activities, limiting the speed of the bridge and its ultimate capacity to carry traffic.

SUMMARY OF THE INVENTION

The present invention improves the performance of two-port transparent bridges by, in a preferred embodiment, avoiding the use of a microprocessor for frame transfer and message discrimination, and by providing distinct data transfer paths for each direction of frame transfer.

The invention reduces the cost of two-port transparent bridges by enormously reducing the requirement for microprocessor speed.

The invention provides distinct means for frame transfer and message discrimination for each direction of frame transfer in a two-port transparent bridge. These means may be implemented by electronic logic means, leaving only message processing and other management activities to be performed by a microprocessor.

Since two separated data paths are utilized, one for each direction of transmission between the two LANs, congestion on a single bus is substantially relieved. While the frame transfer and message discrimination apparatus for each data transmission direction is preferred to be implemented by electronic logic, these functions could be implemented by separate microprocessors. Particularly in the electronic logic form of the invention, since the frame transfer and message discrimination functions are implemented in separate and distinct apparatus, the speed of data transfer and ultimate capacity of the bridge are substantially increased. Further, there is substantial relief of duties implemented by a microprocessor which would otherwise be tied down to frame transfer and message discrimination duties. Thus functioning of the microprocessor as a result of receipt of already discriminated messages is substantially enhanced.

In accordance with an embodiment of the invention, a transparent bridge between a pair of local area networks is comprised of a filtering database for storing destination addresses for frames and messages, and a pair of frame transfer agents each connected to the database for transferring frames in opposite directions from one LAN to the other depending on whether addresses stored in the database correspond to destination addresses of the frames of data and messages.

In accordance with another embodiment of the invention, a transparent bridge between a pair of local area networks (LANs) each being associated with a Medium Access Control function (MAC), is comprised of a pair of frame transfer agents each for receiving frames of data and frames of messages from corresponding MACs, each frame transfer agent being devoid of a microprocessor and containing logic for discriminating between frames of data and messages, and for transferring frames of data in one direction from a corresponding MAC to the other MAC, a local manager connected to each frame transfer agent for processing messages received from either of the frame transfer agents, and for generating messages for each MAC, a filtering database connected to each frame transfer agent for storing a static destination address of the local manager for messages received from one of the MACs, and for storing dynamic destination LAN addresses for frames of data, and each frame transfer agent containing apparatus for accessing the filtering database to determine whether the frames of data received by the transfer agent may be transferred to the other MAC, depending on its destination address, and to determine whether the frames of messages should be passed to the local manager for processing, depending on its destination address.

In accordance with another embodiment of the invention, a two-port transparent bridge between a pair of LANs is comprised of separate apparatus for forwarding frames of data from each of the LANs to the other.

In accordance with another embodiment of the invention, a two-port transparent bridge between a pair of LANs is comprised of separate message discrimination apparatus for messages received from each of the LANs.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
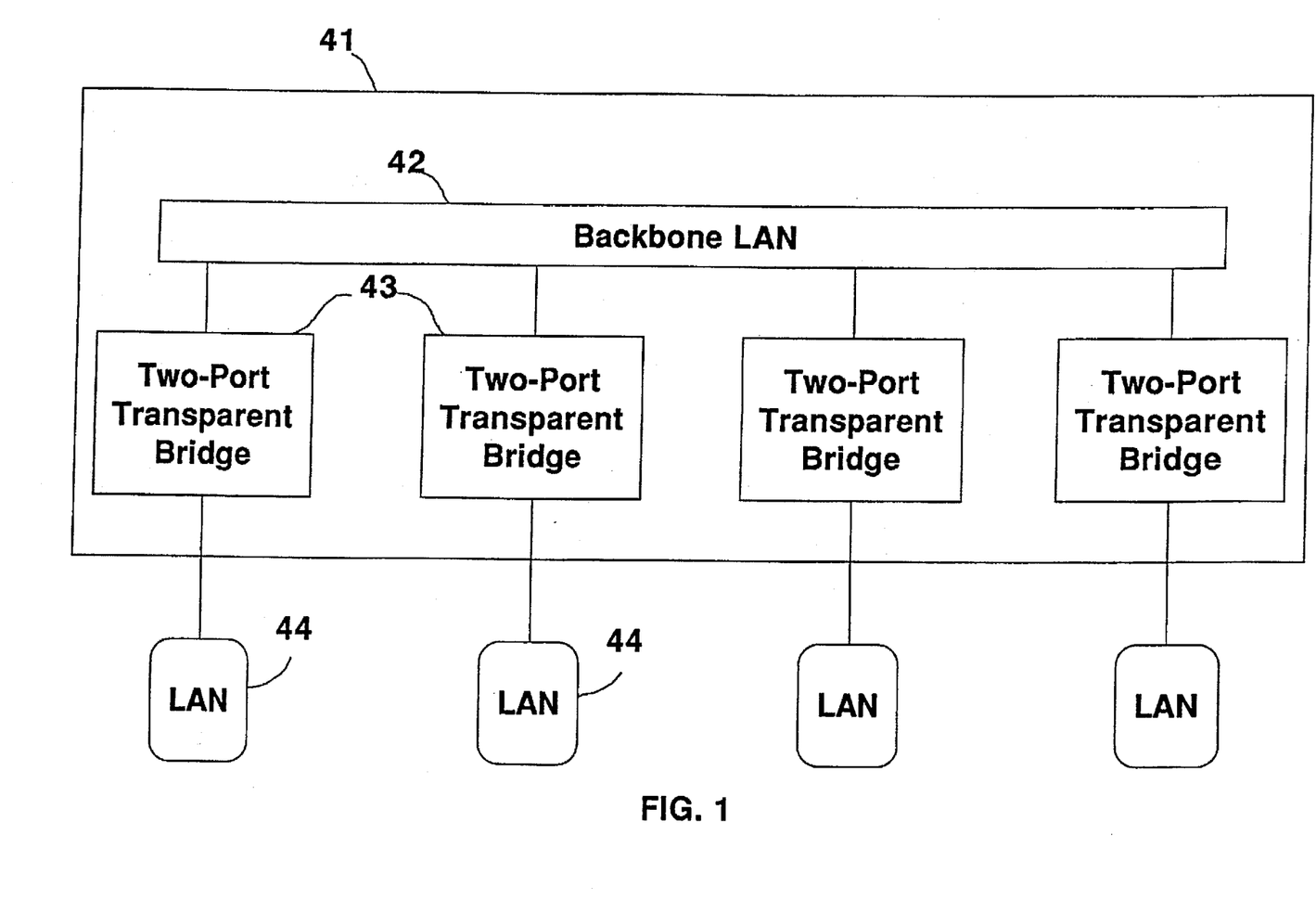
FIG. 1 is a block diagram of a multi-port bridge formed of plural two port bridges.

Two-port transparent bridges are an important special case of multi-port bridges. A multiport bridge with a large number of ports can be constructed from multiple two-port bridges. Such a bridge 41 is displayed in FIG. 1. The multiport bridge 41 is comprised of a plurality of two-port transparent bridges 43. Each two-port transparent bridge 43 is connected to a backbone LAN 42 by one of its two ports, and to a LAN 44 by its other port. The bridging effect of such an arrangement is identical to the bridging effect produced by a multiport bridge as defined by IEEE 802.1d. A natural application of this equivalence is to provide an arrangement in which the backbone LAN 42 has much higher capacity than the other individual LANs 44. The backbone LAN 42 might be implemented as a high speed bus within a single cabinet also containing the two-port transparent bridges.

Figure 1A:
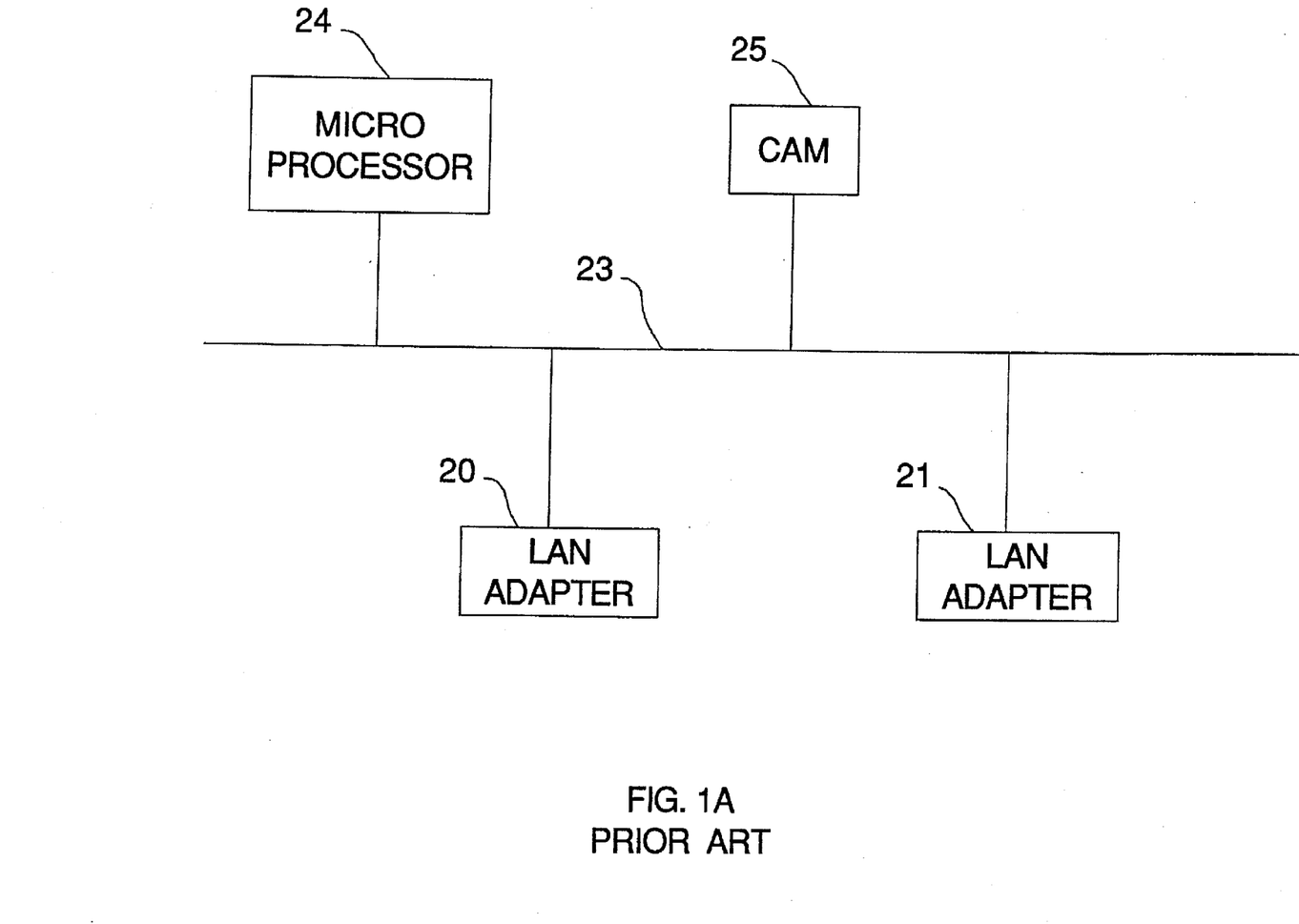
FIG. 1A is a block diagram of a bridge in accordance with the prior art.

FIG. 1A illustrates a block diagram of a two-port transparent bridge in accordance with the prior art. A pair of LANs 20, 21 are connected together via a bus 23. A microprocessor 24 is also connected to the bus, as well as a CAM 25.

In operation, when frames of data and/or messages are to be emitted from LAN 20 or 21, they appear on bus 23. Microprocessor 24 discriminates messages, receives messages destined for itself, determines destination addresses for data frames utilizing CAM 25, etc. and generally controls the transmission of data between one LAN and the other. Microprocessor 24 also carries out software programs, including those operated as a result of messages received via either of the LANs.

It may be seen that bus 23 acts as a highway which, while having a nominal capacity, is substantially degraded since all data passing between the LANs in both directions and between the microprocessor, the CAM and both LANs passes along it. The microprocessor itself must time share, and therefore cannot spend a maximum amount of time implementing the functions commanded by or using data contained within messages received by it. This degrades the capacity of the bridge.

Figure 2:
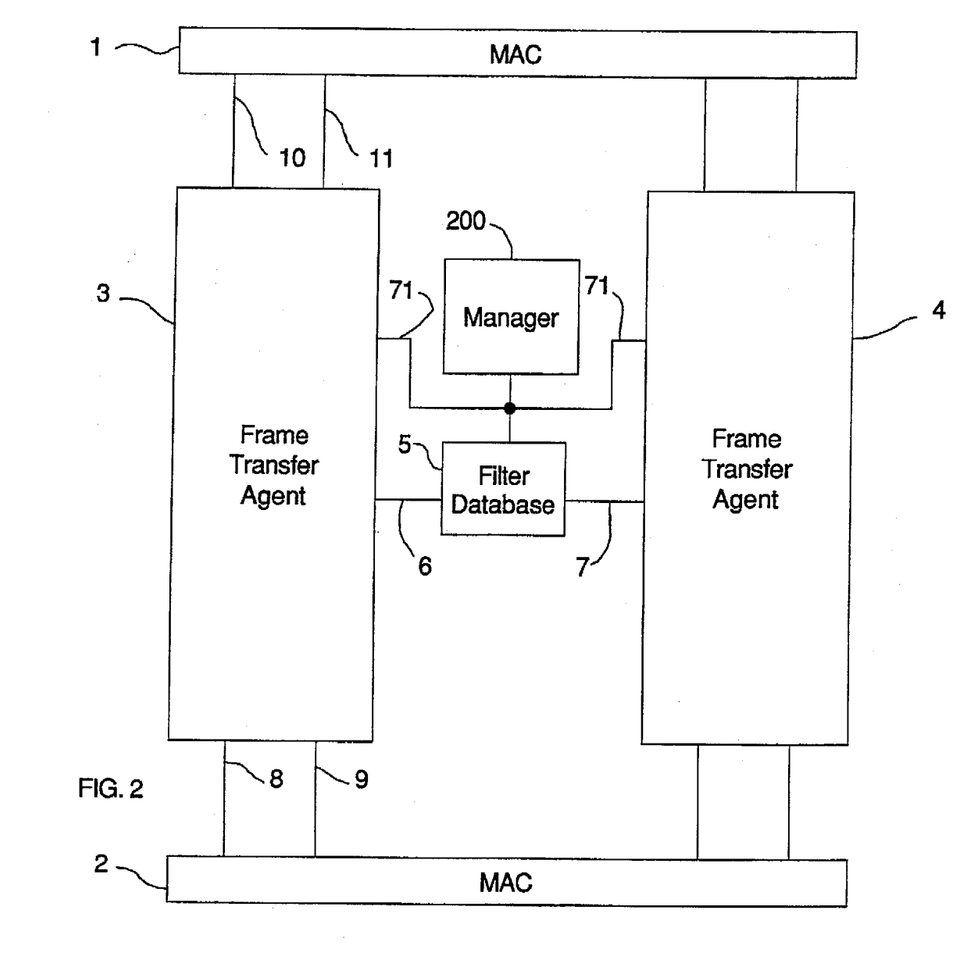
FIG. 2 is a block diagram of an embodiment of the present invention.

A two port transparent bridge in accordance with an embodiment of the invention is illustrated in FIG. 2 and is arranged to transfer frames between two LANs. Each of the two LANs is represented in FIG. 2 by the MAC 1 and MAC 2 functions appropriate to each LAN. MAC functions are well known art, and it is considered that a person skilled in the art can implement the logic described without the exercise of inventive ingenuity. A detailed description of the logic circuits or functions ("logic" hereinbelow) will not be described in order to avoid confusing the reader of the description below of the inventive system.

The invention is applicable to any two LANs using the IEEE 802 address format. In the IEEE 802 address format each frame includes both a destination and a source address, each at a fixed location within the frame, with the source address following immediately after the destination address. The first bit of the destination address indicates whether the destination address designates an individual destination or a group of destinations. Modifications of the frame format or frame information required during the transfer from one LAN to the other are performed by the two MACs 1,2. A MAC which receives a frame from the LAN it represents (the receiving MAC relative to the frame) performs frame check sequence calculation and verification. The received frame check sequence field may be transferred as part of the frame, or stripped by the receiving MAC and regenerated by the transmitting MAC.

In the embodiment of the invention shown in FIG. 2, there are two distinct frame transfer agents 3,4 each responsible for one direction of frame transfer between the two MACs, and a separate manager 200 to process messages and perform other management activities. One manager 200 may manage a plurality of two-port transparent bridges. Both frame transfer agents have access to the common filtering database 5. In FIG. 2, the frame transfer agent 3 transfers frames from the MAC 2 to the MAC 1. The frame transfer agent 4 transfers frames from the MAC 1 to the MAC 2. The two transfer agents are identical except for their direction of operation. Since both frame transfer agents are similar, the description below will be directed only to one, to avoid redundancy.

Figure 3:
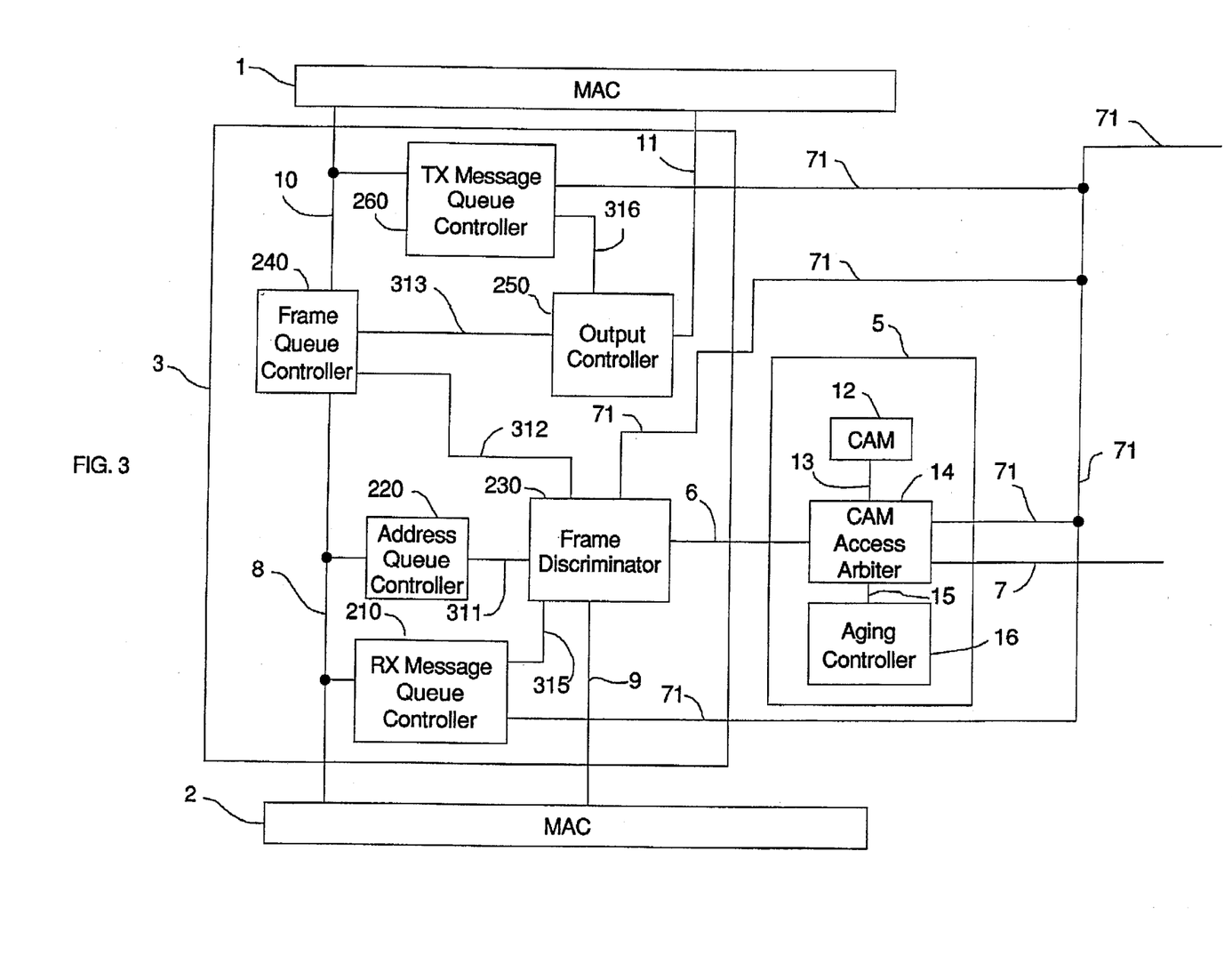
FIG. 3 is a more detailed block diagram of an embodiment of the present invention.

With reference to FIGS. 2 and 3, the manager 200 comprises microprocessor, a memory, and a bus. The manager exchanges signals with the frame transfer agents 3 4, and the filtering database 5 via bus 71. The bus 71 is a conventional microprocessor i/o bus, comprising means to support read and write transactions to specific bus locations, and means to transport interrupt signals. The manager 200 interprets software programs which must receive message frames (messages) from the two LANs, and which must transmit messages on the two LANs. The manager causes a message to be transmitted by the MAC 1 by writing the message to the TX message queue controller 260 of the frame transfer agent 3 over the bus 71. The manager causes a message to be transmitted by the MAC 2 by writing the message to the TX message queue controller of the frame transfer agent 4 over the bus 71. The manager receives notification of received messages from the RX message queue controllers of the two frame transfer agents 3 4. For example, the RX message queue controller 210 of frame transfer agent 3 signals the reception of a message by raising an interrupt signal on the bus 71, and presenting the number of messages in the received message queue in a register which the manager can read on the bus 71. When the presence of one or more messages is indicated the manager reads the messages from the RX message queue controller 210 over the bus 71.

The filtering database 5 comprises a content addressable memory (CAM) 12, a CAM access arbiter 14, and an aging controller 16.

CAMs are well known in the art. The elements of the filtering database are address entries. Each address entry comprises an IEEE LAN address and three bits of associated information. A CAM should be used which can store at least three bits of information with each address entry. The Music Semiconductors LanCAM, product number MU9C1480, is a suitable CAM. The CAM is partitioned into an area for dynamic filtering database entries and an area for static filtering database entries. Dynamic entries are created by the frame discriminator 230 and are deleted by the aging controller 16. Static entries are created by the manager 200.

The three bits stored with each address entry are as follows:

1. a bit for MAC 1 to indicate whether traffic bearing the address as a destination address may be forwarded to the MAC 1, 2. a bit for MAC 2 to indicate whether traffic bearing the address as a destination address may be forwarded to the MAC 2, 3. a bit to indicate whether traffic bearing the address should be diverted to a management entity associated with the two-port frame transfer engine. (Only static entries will so indicate.)

Separate bits are required for blocking traffic in each direction because the permanent filtering database may contain group addresses blocked for forwarding to either or both of the two LANS. Traffic bearing such group addresses may arrive from either LAN.

A CAM access arbiter 14 provides a means for multiple entities to cooperate to ensure that only one of them accesses the CAM at a time. The CAM access arbiter 14 comprises logic means to arbitrate between requests for access to the CAM from the two transfer agents 3, 4, over the paths 6, 7, from the aging controller 16 over the path 15, and from the manager 200 over the bus 71.

The manager 200 controls the static entries of the filtering database by read and write accesses to the CAM 12 over the bus 71. A static address entry with an associated bit indicating that frames bearing the address are to be diverted to the manager 200 is called a message entry. The manager 200 creates message entries for the addresses of each of the two bridge ports, and for the two-port transparent bridge as a whole, as specified by IEEE 802.1d. The manager also creates message entries for the group addresses associated with the spanning tree procedure and other management procedures.

The aging controller 16 comprises a counter and logic to generate a request for deletion of a dynamic entry from the CAM approximately once per second, or as often as necessary to ensure that no dynamic entry of the CAM is older than five to twenty minutes, and logic to present the requests to the CAM 12 as mediated by the CAM access arbiter 14. The aging controller 16 presents a request for deletion of a dynamic entry to the CAM by first sending a signal to the CAM access arbiter over path 15 to claim access to the CAM. The aging controller 16 waits until the CAM access controller 14 returns a signal granting access to the CAM. The aging controller then passes the appropriate signals to the CAM over path 15, through the access arbiter and over the path 13, to cause deletion of a dynamic entry. The method of selection of the dynamic entry to be deleted should be such that no dynamic entry shall remain in the filtering database longer than five to twenty minutes as specified by IEEE 802.1d. One such method is to choose a CAM entry at a displacement into the part of the CAM which may contain dynamic entries one greater than the displacement of the previous deletion request modulo the length of the portion of the CAM which may contain dynamic entries and set the location to empty unconditionally, whether or not it contains an entry. When the deletion is complete, the aging controller 16 then sends a signal to the CAM access arbiter 14 to release access to the CAM so that the two transfer agents may access the filtering database.

The frame transfer agent 3 is comprised of an address queue controller 220, an RX Message queue controller 210, a frame discriminator 230, a frame queue controller 240, an output controller 250, and a TX message queue controller 260.

The direction of frame flow through the frame transfer agent 3 is from the MAC 2 to the MAC 1.

The RX message queue controller 210 comprises a received message queue containing zero or more received messages and a single partial or complete message which is a candidate to be added to the queue of received messages, means to delimit frames in the queue so that one frame at a time may be removed from the queue, logic to store a frame passing on the path 8 as a candidate message under control of signals from the frame discriminator 230, logic to include a complete candidate message as the last message of the queue of received messages under control of signals from the frame discriminator 230, logic to stop accepting further portions of a frame when the received message queue is full, and logic to discard an incomplete frame instead of including it in the queue of received messages even if requested to do so by the frame discriminator 230, logic to discard the candidate message under control of signals from the frame discriminator 230, logic to present the number of messages in the received message queue in a register accessible on the bus 71, logic to raise an interrupt signal on the bus 71, and logic to enable the manager to read the first received message from the received message queue over the bus 71.

The address queue controller 220 comprises an address queue, logic and memory to store up to three or four MAC addresses in the address queue, the three addresses being the source address of one frame, and the destination and source addresses of a following frame, (space to store the source address of the following frame may also be required if CAM accesses are slow) the addresses being extracted from frames carried on the path 8 into the address queue under control of signals received from the frame discriminator 230, logic to control the queue in response to signals from the frame discriminator 230, and logic to deliver the addresses to the frame discriminator 230 over the path 311 in response to control signals received from the frame discriminator 230 over the path 311. When the address queue controller 220 has stored the complete destination address of the frame being received, it sends an indication that the destination address has been stored to the frame discriminator 230 over the path 311. The frame discriminator 230 does not process the source address until reception of the frame is complete, guaranteeing the presence of the source address in the address queue, so no separate signal indicating the presence of the source is required.

The TX message queue controller 260 comprises a TX message queue containing a queue of messages to be transmitted by the MAC 1, means to delimit frames in the queue so that one frame at a time may be removed from the queue, logic to present the amount of free space in the queue in a register accessible to read requests on the bus 71, logic to accept write transactions on the bus 71 to contribute portions of a message to an incomplete message at the tail of the queue of messages to be transmitted, logic to decode a transaction on the bus 71 indicating that the incomplete message has been completed including logic to add the completed message to the tail of messages to be transmitted and increment a counter recording the number of said messages, logic to raise an interrupt signal on the bus 71 when the status of the queue changes from not empty to empty, means to transmit the first message in the queue of messages to the MAC 1 on the path 10 under control of signals received on the path 316 from the output controller 250 including logic to decrement the counter recording the number of messages in the queue, logic to indicate the completion of transmission of a message by sending a signal to the output controller 250 over the path 316, and logic to provide a continuous signal over the path 316 to the output controller 250 indicating whether there is at least one complete message in the queue of message to be transmitted.

The frame queue controller 240 comprises a frame buffer memory, pointers into the frame buffer memory and logic to maintain a forwarding queue of frames to be forwarded to the MAC 1, means to delimit frames in the forwarding queue so that one frame at a time may be removed from the queue, logic to receive frames on the path 8 under control of signals received from the frame discriminator 230 over the path 312 and to store the frames in a portion of the frame buffer memory not occupied by the forwarding queue, logic to receive a completion status over the path 312 from the frame discriminator 230 for each received frame, logic to delete the last received frame from the frame buffer memory under control of a discard frame completion status signal received from the frame discriminator over the path 312, logic to append the last received frame in the frame buffer memory to the forwarding queue under control of a keep frame completion status signal received from the frame discriminator 230 over the path 312, logic to transmit the frame at the head of the forwarding queue on the path 10 under control of signals received from the output controller 250 over the path 313, logic to convey the number of complete frames present in the frame buffer memory to the output controller 250 over the path 313, logic to stop storing portions of a received frame in the frame buffer memory if the frame buffer memory is full, and logic to signal to the frame discriminator 230 over the path 312 that portions of a frame being received are not being stored in the frame buffer memory because there is insufficient space in the frame buffer memory. Since the transfers from the MAC 2 over the path 8, and transfers out of the frame buffer memory to the interface 1 over path 10 are not synchronized, the frame queue controller also comprises logic to arbitrate between these unsynchronized transfers for access to the frame buffer memory.

The output controller 250 determines from signals presented over the path 313 by the frame queue controller when the number of complete messages in the forwarding queue is greater than zero, determining from signals presented over the path 316 by the TX message QUEUE controller when the number of complete messages in the TX message queue is greater than zero, sends a signal commanding the frame queue controller to transmit the frame at the head of the forwarding queue over the path 10 to the MAC 1, sends a signal commanding the TX message queue to transmit the message at the head of the TX message queue over the path 10 to the MAC 1, determines from signals presented continuously over the path 11 by the MAC 1 when the MAC 1 can transmit a frame on the medium, sends a signal over the path 11 commanding the MAC 1 to accept transmission of a frame over the path 10 for transmission by the MAC 1 on its medium.

The frame discriminator 230 looks up an entry in the filtering database, and performs different actions depending on the result of the lookup action.

To look up an entry in the filtering database, the frame discriminator 230 sends a signal over the path 6 to claim access to the CAM access arbiter, waits until access is granted by a signal returning on path 6, then causes the address to be looked up in the CAM by sending the address and appropriate control signals over the path 6. The CAM sends back a signal on the path 6 indicating whether the looked up address is present in the CAM. If the looked up address is present in the CAM, the CAM also returns signals on the path 6 containing the three bits of information associated with the address in the filtering database. When the frame discriminator 230 has received these signals over the path 6, it sends a signal to the CAM access arbiter over the path 6 to release access to the CAM so that the other transfer agent and the aging controller may use the filtering database.

The frame discriminator 230 is also comprised of an internal discard frame status indication in which it records whether a condition has occurred which should cause the frame discriminator 230 to command the frame queue controller 240 to delete and not forward the frame when reception of the frame is complete.

The frame discriminator 230 is also comprised of logic to initialize the discard frame status indicator at the commencement of each frame reception to a value, TRUE or FALSE, in a register of the frame discriminator; the value may be set by the manager 200 by a write transaction on the bus 71. The initial value set by the manager 200 remains in effect for all received frames until set again by the manager 200. The manager can block all frame forwarding to the MAC 1 by setting the initial value for the discard frame status indicator to TRUE, and permit normal forwarding by setting the value to FALSE. The manager will set the value to TRUE when the port for MAC 1 is in the listening, learning, or blocked states, as specified by IEEE 802.1d.

The MAC 2 signals the commencement of frame reception to the frame discriminator 230 over the path 9. The frame discriminator 230 sets the discard frame status indicator to the initial value specified in the appropriate register, and sends control signals to the address queue controller 220, the frame queue controller 240, and the RX message queue controller 210. The signal to the address queue controller 220 is sent over path 311, and causes the address queue controller to begin to store the bits of the destination and source address of the frame into the address queue as the frame flows past the address queue controller 220 on the path 8. The signal to the frame queue controller 240 is sent over the path 312, and causes the frame queue controller to begin receiving the frame over the path 8 and to store the frame in the frame buffer memory in an area not occupied by the forwarding queue. If portions of the frame are received while the frame buffer memory is full, the frame queue controller 240 sends an indication signal to the frame discriminator 230 that portions of the frame have been discarded. Reception of the signal by the frame discriminator 230 causes the frame discriminator to set the discard frame indicator to TRUE. The signal to the RX message queue controller 210 is sent over the path 315, and causes the RX message queue controller to begin storing the frame flowing on path 8 into the RX message queue.

When the address queue controller 220 indicates to the frame discriminator 230 over the path 311 that the destination address has been stored in the address queue, the frame discriminator 230 waits until it has completed processing the source address of the perceived frame if said processing is still in progress, then looks up the destination address in the filtering database. If the destination address is present in the filtering database the CAM returns the three bits of information associated with the destination address in the filtering database. If the appropriate returned bit indicates that the frame is a message destined for the management processor, the frame discriminator 230 sets the frame discard indicator to TRUE and sends an is-message signal to the RX message queue controller 210 over the path 315, and otherwise sends an is-traffic signal to the RX message queue controller. The frame discriminator 230 checks the appropriate returned bit to determine whether traffic with the destination address may be forwarded to the MAC other than the one from which the frame was received; if not, the frame discriminator 230 sets the frame discard indicator to TRUE.

When the MAC 2 detects that the end of the frame has been received, it signals this event to the frame discriminator 230 over the path 9 together with a signal indicating whether the frame check sequence calculation indicates that the received frame check sequence field has the same value as the value calculated by the MAC 2.

If the frame check sequence calculation has indicated that the frame is intact, the frame discriminator 230 extracts the source address from the address queue controller 220 (the source address is guaranteed to be the address at the head of the address queue) and looks it up in the filter database. If the source address is NOT found in the filter database, the frame discriminator 230 claims access to the CAM to cause a dynamic address entry to be created for the source address and to cause the following three bits of information to be stored in the CAM in association with the source address: the appropriate bit to indicate that traffic bearing the address as a destination may NOT be forwarded to the MAC from which the frame was received, the appropriate bit to indicate that traffic bearing the address as a destination MAY be forwarded to the MAC other than the one from which the frame was received, the appropriate bit to indicate that frames bearing the address as a destination are not message frames; then to send a signal over the path 6 releasing access to the CAM so that the other transfer agent and the aging controller may access the CAM.

The addresses of a subsequent frame may be arriving in the address queue while the source address of the frame is being looked up and stored in the filter database, requiring the space provided in the address queue to be long enough for three addresses and perhaps long enough for four addresses if the CAM is slow.

The frame discriminator 230 determines that the frame should be forwarded if and only if the received value of the FCS equalled the value calculated by the MAC 2 and the discard frame indicator is FALSE. If the frame discriminator 230 determines that the frame should be forwarded, the frame discriminator 230 sends a keep frame signal to the frame queue controller 240 over the path 312, otherwise the rame discriminator 230 sends a discard frame signal to the frame queue controller 240 over the path 312.

When the RX message queue controller 210 receives a frame-complete signal from the frame discriminator, it has previously received either the is-message signal or the is-traffic signal from the frame discriminator 230. Upon reception of the frame-complete signal, the RX message queue controller 210 first determines if the whole frame has been stored in the RX message queue. If there was insufficient space to store the complete frame, the RX message queue controller 210 discards the partial frame. If a complete frame was stored, and the RX message queue controller 210 previously received the is-traffic signal, the RX message queue controller 210 discards the frame and does not include it in the queue of messages. If a complete frame was stored and the RX message controller previously received the is-message signal from the frame discriminator 230, the RX message queue controller 210 includes the frame as a message in the received message queue, increments the counter which represents the number of messages in the received message queue, and raises an interrupt on the bus 71.

When the frame queue controller 240 receives a keep frame signal from the frame discriminator 230 over the path 312, the frame queue controller 240 sets the pointers into the frame buffer memory to include the stored frame in the forwarding queue, then increments the counter indicating the number of frames in the forwarding queue. When the frame queue controller 240 receives a discard frame signal from the frame discriminator 230 over the path 312, the frame queue controller resets the pointers into the frame buffer memory so that the received frame does not become part of the forwarding queue, and so that the memory occupied by the received frame will be re-used for the next frame to be received.

The frame queue controller 240 sends all changes of the count of the number of frames in the forwarding queue to the output controller 250 over the path 313. Whenever a frame is not being transmitted to the MAC 1 from the frame queue controller 240 over the path 10, and the count of frames in the forwarding queue is greater than zero, the output controller 250 sends a signal to the MAC 1 over the path 11 requesting permission to transmit a frame, and waits until a signal granting permission is received back over the path 11.

The TX message queue controller sends all changes of the count of the number of frames in the TX message queue to the output controller 250 over the path 316. Whenever a frame is not being transmitted to the MAC 1 from the frame queue controller 240 over the path 10, and the count of frames in the TX message queue is greater than zero, the output controller 250 sends a signal to the MAC 1 over the path 11 requesting permission to transmit a frame, and waits until a signal granting permission is received back over the path 11.

The frame queue controller 240 keeps track of whether the frame queue controller 240 or the TX message queue controller 260 most recently transmitted a frame over the path 10 to the MAC 1, and gives priority for frame transmission to the controller which has not most recently transmitted a frame. When the MAC 1 indicates via a signal sent over the path 11 that it is ready to accept a frame for transmission, the output controller 250 sends a signal authorizing the controller which has the turn according to the said priority to transmit the frame at the head of its queue to the MAC 1 over the path 10. (If only one controller is ready, it is the turn of that controller.) The signal is sent over the path 316 if to the TX message queue controller 260, and over the path 313 if to the frame queue controller 240.

The controller which receives the authorization signal commences transmission of the frame at the head of its queue to the MAC 1 over the path 10. When the transmission is complete the controller sends a transmission complete signal to the output controller 250.

When the output controller receives the transmission complete signal, it sends a transmission complete signal to the MAC 1 so that the MAC can commence appending the FCS and complete its transmission to the LAN medium. The output controller then continues as described.

It should be noted that the frame transfer agents, rather than being comprised of hard wired logic, e.g. one or two ASICs, may themselves be implemented in separate microprocessors. While this is the less preferred embodiment, it should be noted that in this case the separate data transfer paths between LANs is still maintained.

The filtering database may be implemented with two CAMs rather than one. The dual CAM embodiment of the invention has a separate CAM for each direction of frame transfer, and hence may have higher performance in bridges for very high speed LANs. The single CAM solution has been presented as the preferred embodiment because CAMs that are currently available are fast enough to provide the capacity needed for both directions of frame transfer with the LANs that are commercially important at the time of the application. A summary of the modifications of the one CAM embodiment necessary to support two CAMs is as follows:

With two CAMs, one CAM is associated with each frame transfer agent, and is devoted to its lookup requirements. The frame discriminator discards a frame when the destination address of the frame is found in the filter database: the two bits indicating whether each address is blocked for each of the two directions are no longer required. Only one bit needs to tbe associated with each address in the filter database: the bit indicating whether frames bearing the address are messages destined for the local manager. Other changes required to the one CAM embodiment are the removal of the direction bits, the accessing of the manager of both CAMs, and the aging of the dynamic entries in both CAMs.

A person understanding this invention may now conceive of alternative structures and embodiments or variations of the above. All of those which fall within the scope of the claims appended hereto are considered to be part of the present invention.

I claim:

1. A transparent bridge between a pair of local area networks (LANs) each being associated with a MAC, comprising:

(a) a pair of frame transfer agents connected in parallel between the LANs each for receiving frames of data and frames of messages from corresponding MACs, each frame transfer agent for discriminating between said frames of data and frames of received messages, for transferring frames of data in only one direction opposite from the other frame transfer agent of the pair from a corresponding MAC to the other MAC and being devoid of microprocessor, (b) a local manager connected to each frame transfer agent for receiving said received messages and for processing said received messages received from either of the MACs, and for generating further messages for each MAC, (c) a filtering database connected to each frame transfer agent for storing a static destination address of said local manager of said received messages received from one of the MACs, and for storing dynamic destination LAN addresses for frames of data, and (d) each frame transfer agent containing means for accessing the filter database to determine whether the frames of data received by the transfer agent are transferable to said other MAC, depending on a destination address of said other MAC, and to determine whether the frames of said received messages are transferable to the local manager for processing, depending on a destination address of said local manager.

2. A bridge as defined in claim 1, in which the data addresses stored in the filter database each contains bits designating whether frames bearing an address of one of the MACs are forwardable thereto, whether frames bearing an address of the other of the MACs are forwardable thereto, and whether frames are directable to said local manager.

3. A two-port transparent bridge between a pair of LANs comprising separate means for connection to said LANs, separate parallel data path means for carrying data in mutually opposite directions in communication with said connection means and at least two separate processing means each in communication with a respective one of said data path means for forwarding frames of data only in respectively opposite directions from each of the LANs to the other via said data path means, and further including separate message discrimination means coupled to the LANs for receiving and discriminating messages from each of the LANs destined for a local manager.

4. A bridge as defined in claim 3 in which each of said separate message discrimination means is devoid of a programmable processor.

* * * * *